(12) United States Patent
Dawson et al.

(10) Patent No.: US 9,771,783 B2
(45) Date of Patent: *Sep. 26, 2017

(54) METHOD OF FRACTURING WITH NON-DERIVATIZED GUAR CONTAINING FLUID

(71) Applicant: Baker Hughes Incorporated, Houston, TX (US)

(72) Inventors: Jeffrey C. Dawson, Conroe, TX (US); Hoang Van Le, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/522,326

(22) Filed: Oct. 23, 2014

(65) Prior Publication Data

US 2015/0060067 A1 Mar. 5, 2015

Related U.S. Application Data

(63) Continuation of application No. 11/144,567, filed on Jun. 3, 2005, now Pat. No. 8,895,480.

(60) Provisional application No. 60/577,407, filed on Jun. 4, 2004.

(51) Int. Cl.
| | |
|---|---|
| *E21B 43/00* | (2006.01) |
| *C09K 8/76* | (2006.01) |
| *C09K 8/88* | (2006.01) |
| *C09K 8/90* | (2006.01) |
| *C09K 8/68* | (2006.01) |
| *E21B 43/26* | (2006.01) |
| *E21B 43/267* | (2006.01) |

(52) U.S. Cl.
CPC .............. *E21B 43/26* (2013.01); *C09K 8/685* (2013.01); *C09K 8/887* (2013.01); *E21B 43/267* (2013.01); *C09K 2208/26* (2013.01)

(58) Field of Classification Search
None
See application file for complete search history.

(56) References Cited

U.S. PATENT DOCUMENTS

| | | | | |
|---|---|---|---|---|
| 3,740,360 | A * | 6/1973 | Browning et al. | C09K 8/512 106/205.01 |
| 5,234,825 | A * | 8/1993 | McCleary | A23G 9/32 435/101 |
| 5,981,446 | A * | 11/1999 | Qiu | B01F 3/0861 166/308.5 |
| 2004/0127367 | A1* | 7/2004 | Crews | C09K 8/68 507/100 |
| 2007/0169932 | A1* | 7/2007 | Lindvig | C09K 8/52 166/250.1 |

* cited by examiner

*Primary Examiner* — John J Figueroa
(74) *Attorney, Agent, or Firm* — John Wilson Jones; Jones Delflache LLP

(57) ABSTRACT

A well fracturing fluid is shown which includes an aqueous base fluid, a hydratable polymer, such as a guar gum, and a suitable crosslinking agent for crosslinking the hydratable polymer to form a polymer gel. The hydratable polymer has a higher molecular weight which is achieved by improvements in the processing of the guar split. The higher molecular weight polymer provides improved performance in well fracturing operations.

20 Claims, No Drawings

METHOD OF FRACTURING WITH NON-DERIVATIZED GUAR CONTAINING FLUID

CROSS REFERENCE TO RELATED APPLICATION

This application is a continuation application of U.S. patent application Ser. No. 11/144,567, filed Jun. 3, 2005, now U.S. Pat. No. 8,895,480, which claims the benefit of U.S. patent application Ser. No. 60/577,407, filed Jun. 4, 2004.

BACKGROUND OF THE INVENTION

Field of the Invention

The present invention relates to gelled fracturing fluids of the type used in well bore operations, to an improved polymer for use in such fluids, and to a method of treating or fracturing a subterranean formation using such a fluid.

Description of the Prior Art

Hydraulic fracturing is a process to enhance the production of oil and gas from wells drilled through hydrocarbon bearing subterranean formations. It can also be used to improve the water injection characteristics of water injection wells used to support hydrocarbon production in water flood projects. Most often, the process occurs by injecting a viscous fluid through the well tubulars at suitable rates and pressure, allowing the formation in contact with the tubulars to respond by fracturing. Once the fracture in initiated and grows at a steady rate, a propping agent is added to the viscous gel and is pumped into the growing fracture. Once all the proppant-laden fluid is pumped, a final proppant free fluid is pumped as a flush to clean the tubulars of proppant-laden fluid.

Afterwards, the gel slowly degrades to low viscosity and the fracture relaxes and closes on the proppant pack. When the well is opened and the thin treating fluid flows out of the well, the well is said to be cleaning up. The degree of clean-up most often determines ultimate hydrocarbon production from the well. One factor that hinders clean-up is the amount of gel residue left in the proppant pack from the viscosifying agent. The preferred viscosifying agents are polysaccharides (galactomannans) such as guar gum and guar gum derivatives such as carboxymethyl guar, carboxymethylhydroxypropyl guar or hydroxypropyl guar, and to a much lesser extent, cellulose derivatives such as hydroxyethyl cellulose or carboxymethylhydroxyethyl cellulose. One of the most preferred viscosifying agents is guar gum. Most often, the polymer is used from 0.24 to 0.72% (wt/vol). The viscosity of the polymer solution is enhanced by crosslinking the polymer to form a gel. One preferred method to gel the polymer solution is to crosslink the fluid with borate compounds in alkaline environments. References to this technology include that found in U.S. Pat. No. 5,160,643 (Dawson); U.S. Pat. No. 5,145,590 (Dawson); U.S. Pat. No. 4,974,077 (Free) and U.S. Pat. No. 4,619,776 (Mondshine). The pH is often adjusted to alkaline values with buffers such as potassium carbonate or mixtures of potassium carbonate and potassium hydroxide. The optimum pH ranges from about 9.5 to 11.5. The most preferred ranges are from 9.8 to 10.5. The borate crosslinker can be any borate ion source and includes boric acid, sodium borate, including anhydrous or any hydrate, borate ores such as colemanite or ulexite and any borate complexed to organic compounds to delay the release of the borate ion such as is taught in U.S. Pat. No. 5,145,590. Because various sources of borate ions each have their own preferred concentration based on the particular job application pH and temperature, the optimum borate ion concentration is that which provides the best gel under the given conditions. This usually ranges from 0.001% to 1.5% (by wt of aqueous fluid) of crosslinking agent and the most preferred being 0.005% to 1.0% (by wt of aqueous fluid).

Although guar-borate gels satisfy most properties necessary to successfully fracture formations, they do have some limitations. For example, although such gels can be degraded by enzymes such as the system described in U.S. Pat. No. 5,067,566 (Dawson), and oxidants such as described by U.S. Pat. No. 5,624,886 (Dawson) and U.S. Pat. No. 5,253,711 (Mondshine), substantial formation damage inhibiting production can still exist. In an effort to reduce such damage, another approach, used together with gel degrading substances, is to use less guar gum as described by U.S. Pat. No. 5,681,796 (Nimerick). In the case of the >796 patent, the polymer concentration was reduced to less than 0.24% by using a special alkaline buffer system. The viscosity of a 0.18% (wt/vol) guar gel was shown initially to be 140 cP at 100 $sec^{-1}$ and 140° F. and after 3 hr was 105 cP. In another example, the viscosity of a 0.24% (wt/vol) guar gel was shown initially to be 285 cP at 100 $sec^{-1}$ and 175° F. and after 3 hr declined to 180 cP. Although the viscosity shown is greater than that of a polymer solution having a guar polymer concentration ranging from 0.24 to 0.72% (wt/vol) it is lower than most fluids used in hydraulic fracturing applications. In those treatments, the viscosity used to fracture wells is normally two to five times greater than that shown in U.S. Pat. No. 5,681,796. Most often when using less polymer in the gel, the essential properties necessary to perform the fracturing treatment suffer, often limiting the treatment to a small percentage of wells.

Thus, while improvements have been made in the field of galactomannan based fracturing fluids, a need continues to exist to provide fluids with adequate viscosity, fluid loss and other essential properties for performing a fracturing operation, while at the same time being less damaging to the surrounding formation than the prior art treatments.

SUMMARY OF THE INVENTION

In this invention, an improved fracturing fluid having a lower polymer loading is described that does not compromise essential fluid properties necessary to perform the fracturing treatment. The well fracturing fluid of the invention includes an aqueous base fluid, a hydratable polymer and a suitable crosslinking agent for crosslinking the hydratable polymer to form a polymer gel. The preferred hydratable polymers are guars or derivitized guars. The hydratable polymer has a higher molecular weight than that previously used in hydraulic fracturing. The higher molecular weight is achieved by improvements in the processing conditions used to convert the guar split (seed endosperm) to a fine powder. One way of characterizing the higher molecular weight of the preferred hydratable polymer is by measuring the intrinsic viscosity of the polymer. The hydratable polymer of the invention has an intrinsic viscosity greater than about 14 dL/g, most preferably greater than about 16 dL/g.

For purposes of the present invention, the preferred class of crosslinking agents is a source of borate ions. The source of borate ions can be selected from the group consisting of alkali metal borates, alkaline earth metal borates, boric acid, borate ores, borates complexed to organic compounds, and mixtures thereof. The preferred fracturing fluid also further includes a buffering agent, such as potassium carbonate or potassium hydroxide, which is effective to provide a pH for the fluid in the range from about 9.5 to 11.5. The fracturing fluid will also typically have incorporated therein a breaker for the gelled fluid which can be any of the type commonly employed in the art for borate crosslinked guar based fluids.

In the method of fracturing a subterranean formation using the fracturing fluid of the invention, a gellable fracturing fluid is first formed by blending together an aqueous fluid, a hydratable polymer and a suitable crosslinking agent for crosslinking the hydratable polymer to from a polymer gel. The hydratable polymer has an intrinsic viscosity greater than about 14 dL/g. The polymer concentration generally ranges from 0.09% to 0.72% and more often from 0.12% to 0.60% and most often from 0.14% to 0.36%. The fluid can also contain most agents used to control fines or clay swelling or migration such as clay substitutes of the type based on tetramethylammonium chloride, or potassium chloride or polycationic clay control additives such as Claymaster 5C J, a product of Baker Hughes Incorporated, or mixtures of these clay control additives. The polymer gel is pumped into the subterranean formation for a time and at a pressure sufficient to fracture the formation.

Additional objects, features and advantages will be apparent in the written description which follows.

DETAILED DESCRIPTION OF THE INVENTION

The well fracturing fluid of the invention has blended therein an aqueous base fluid, a hydratable polymer and a suitable crosslinking agent for crosslinking the hydratable polymer to form a polymer gel. The aqueous fluid can be, for example, water or brine. Any suitable mixing apparatus may be used for the blending step. In the case of batch mixing, the hydratable polymer and aqueous fluid are blended for a period of time which is sufficient to form a hydrated sol. A crosslinker and a suitable proppant are added to the sol.

The preferred crosslinking agents for purposes of the present invention comprise a source of borate ions. The source of borate ions can conveniently be selected from the group consisting of alkali metal borates, alkaline earth metal borates, boric acid, borate ores, borates complexed to organic compounds, and mixtures thereof. While the optimum borate ion concentration may vary with each particular job application, a concentration in the range from about 0.001% to 1.5% (by wt of aqueous fluid), and most preferably from about 0.005% to 1.0% by weight can be used for practicing the present invention.

The fluids of the invention are also typically buffered to a desired alkaline pH range. The pH range can be adjusted with any of a number of available alkaline buffers of the type commonly used in the industry, such as potassium carbonate or mixtures of potassium carbonate and potassium hydroxide. The optimum pH range is from about 9.5 to 11.5, most preferably from about 9.8 to 10.5.

The fracturing fluids of the invention will also typically contain a breaker for the crosslinked gel. The breaker is used to assist in removal or breakdown of the fracturing fluid upon completion of the fracturing operation. Breakers can include any of those commonly employed in the art for borate crosslinked systems including, for example, oxidants such as ammonium persulfate or peroxide. U.S. Pat. No. 5,624,886, to Dawson et al., describes a breaker system which utilizes a substantially insoluble oxidant instead of a coated soluble oxidant, e.g., a persulfate. The breaker is incorporated into the gellable fracturing fluid in the form of a pellet or prill material. The pellet material comprises the substantially insoluble oxidant and a binder for the oxidant. The substantially insoluble oxidant is selected from the group consisting of alkaline earth and zinc salts of peroxide, perphosphate, perborate and percarbonate. U.S. Pat. No. 5,067,566 to Dawson, teaches an enzyme breaker system which can be utilized for purposes of the present invention. These breaker systems are merely intended to be illustrative of the present state of the art.

The fracturing fluids of the invention will also typically have incorporated therein a suitable proppant. Propping agents are typically added to the base fluid prior to the addition of the crosslinking agent. Propping agents include, for instance, quartz sand grains, glass and ceramic beads, walnut shell fragments, aluminum pellets, nylon pellets, and the like. The propping agents are normally used in concentrations between about 1 to 8 pounds per gallon of fracturing fluid composition but higher or lower concentrations can be used as required.

The base fluid can also contain other conventional additives common to the well service industry such as surfactants, corrosion inhibitors, and the like.

The fracturing fluids of the invention also contain a hydratable polymer which is crosslinked to give the fluid the desired proppant carrying ability, as well as other desired characteristics. The guar-borate gel used in this invention is based on a guar polymer having a higher molecular weight than that previously used in hydraulic fracturing. Surprisingly, a polymer having higher molecular weight was found that provided improved performance in the fracturing treatments. The cause of the increased molecular weight is due to improved processing conditions used to convert the guar split to a fine powder. Most often, the guar split, being about 0.3 cm in diameter, is partially hydrated and sheared through a roll mill to produce a flake. The flake, being more fragile, can then be dried and pulverized by a high impact mill. Throughout this process, there are times when the guar polymer is subjected to high mechanical shear. A means of obtaining a higher molecular weight polymer occurs at those places of high mechanical shear in the process. The shear process is modified so that the ultimate amount of shear is the same, but the rate of shear is reduced to allow the polymer chains in the split to relax rather than rupture. Therefore by reducing the shearing rate, the degree of rupture is reduced and the polymer molecular weight is higher.

The difference in molecular weight can be directly measured by gel permeation chromatography and indirectly by measuring dilute polymer solution viscosity such as the intrinsic viscosity and by the viscosity of concentrated polymer solution gelled by crosslinking. The intrinsic viscosity can be used to compare polymer sizes of the same type of polymer because the viscosity is proportional to the effective hydrodynamic volume of the polymer molecule divided by the molecular weight. The measuring of the improved guar polymer of the invention is demonstrated in the examples provided below.

EXAMPLE A

The intrinsic viscosity was measured by first determining the moisture content of the guar polymer. The high molecular weight polymer of the invention had moisture content of 4.01% (wt). A dilute solution was prepared by dissolving, with high agitation, 0.26048 g of guar in DI water and hydrated for 30 min followed by the addition of 1.0 ml of 50% aqueous tetramethylammonium chloride (TMAC) to make 1.00 l of fluid. This fluid was then hydrated overnight in low shear. Afterwards, aliquots of the polymer solution were further diluted to yield three solutions having the following concentrations in 0.1% (vol) TMAC.

| Polymer Solution | Concentration (dL/g) |
|---|---|
| A | $2.00028 \times 10^{-2}$ |
| B | $1.50021 \times 10^{-2}$ |
| C | $1.00014 \times 10^{-2}$ |

The viscosity was then measured in a Canon Fenske capillary 100 tube at 27.0° C. As a base for comparison, the time of flow from one capillary level to the other of a 0.1% (vol) TMAC solution was initially measured. In all cases, the measurement was repeated at least 5 times and averaged. The sample volume in each measurement was 10.0 ml. The flow times for the TMAC solution and the four polymer concentrations is shown.

| Polymer solution | Flow time (sec) | Reduced Viscosity |
|---|---|---|
| 0.1% (wt) TMAC | 61.93 | |
| A | 86.24 | 17.33 |
| B | 79.24 | 16.99 |
| C | 73.02 | 16.85 |

Intercept = 16.34
Slope = 47.993

The flow times of the four polymer solutions were repeatedly measured and averaged. The reduced viscosity was calculated by taking the difference of the polymer solution time and the TMAC baseline time and dividing that difference by both the TMAC baseline time and the polymer concentration. The calculated reduced viscosity was then plotted against concentration in the units of dL/g. Linear regression analysis provides an equation of a line and the intercept at zero concentration is the intrinsic viscosity. The intrinsic viscosity of this polymer is about 16.3 dL/g.

EXAMPLE B

Example A was repeated using the standard guar polymer typically used in fracturing applications. The polymer concentration, after the stock solution hydrated overnight is shown below.

| Polymer Solution | Concentration (dL/g) |
|---|---|
| A | $1.99981 \times 10^{-2}$ |
| B | $1.49986 \times 10^{-2}$ |
| C | $9.99904 \times 10^{-3}$ |

The flow times for the 0.1% TMAC and the four standard guar solutions is shown below.

| Polymer Solution | Flow Time (sec) | Reduced Viscosity |
|---|---|---|
| 0.1% TMAC (wt) | 61.65 | |
| A | 83.38 | 15.73 |
| B | 77.22 | 15.47 |
| C | 71.42 | 15.00 |

Intercept = 14.305
Slope = 73.01

The intrinsic viscosity of this polymer was found to be 14.3 dL/g. In comparison to Example A, the intrinsic viscosity is about 2 dL/g lower than the preferred polymer of this invention suggesting that the polymer hydrodynamic volume and molecular weight is larger for the new polymer.

EXAMPLE C

The rheology of a preferred fluid of the invention was measured using the Fann 50 C viscometer. Into 1 l of water was added, with vigorous stirring, 1.92 g of the preferred polymer and stirred for 30 min. Then, the stirring rate was reduced so as not to entrain air and 1.0 ml of a 50% (wt) aqueous solution of tetramethylammonium chloride (TMAC) and 1.0 ml of a surfactant designed to assist clean-up were also added. The solution was then treated with 1.0 ml of 45% (wt) aqueous potassium carbonate and 1.25 ml of a borate solution composed of 16% (wt) boric anhydride in methanol. Gelation occurred in about 20 sec and the pH was 9.7. Then 42 g was placed into the Fann 50 C cup and the cup placed on the viscometer and pressured to 200 psi with $N_2$. An initial rate sweep was conducted using 105, 85, 65 and 45 $sec^{-1}$. The accompanying stress and the rates were used to calculate the Power Law indices n= and K= as defined in API bulletin RP39. The viscosity at 100 $sec^{-1}$ was then calculated from the Power law indices. The fluid was then heated to 125° F. and sheared at an interim rate of 105 $sec^{-1}$. Rate sweeps were repeated about every 15 min.

| Time (min) | Temp (° F.) | n = | K = | Viscosity (cP at 105 $sec^{-1}$) |
|---|---|---|---|---|
| 2 | 77 | 0.8237 | 0.03771 | 802 |
| 18 | 121 | 0.4912 | 0.06358 | 292 |
| 34 | 120 | 0.6697 | 0.02507 | 262 |
| 50 | 117 | 0.5531 | 0.03680 | 225 |
| 66 | 115 | 0.5664 | 0.03944 | 256 |
| 82 | 118 | 0.6068 | 0.02934 | 230 |
| 98 | 124 | 0.6258 | 0.02824 | 241 |
| 114 | 125 | 0.5947 | 0.03814 | 282 |
| 130 | 125 | 0.6368 | 0.02932 | 264 |
| 146 | 125 | 0.6032 | 0.03229 | 249 |
| 162 | 125 | 0.4544 | 0.06324 | 229 |
| 178 | 125 | 0.6232 | 0.03133 | 265 |
| 194 | 125 | 0.6594 | 0.02891 | 288 |
| 210 | 125 | 0.6596 | 0.02955 | 295 |
| 226 | 125 | 0.5910 | 0.03267 | 238 |
| 242 | 125 | 0.5987 | 0.0304 | 229 |
| 258 | 125 | 0.6254 | 0.02932 | 250 |
| 274 | 125 | 0.5919 | 0.03376 | 247 |
| 290 | 125 | 0.5475 | 0.04158 | 248 |
| 306 | 125 | 0.5379 | 0.04280 | 244 |

This example shows that at a polymer concentration of 0.192%, the fluid had enough viscosity over 5 hr. to adequately perform fracturing treatments in wells with bottom hole static temperatures of 125° F. or less.

EXAMPLE D

The test conducted in Example C was repeated by adding, with vigorous stirring, 2.16 g of the preferred guar polymer to 1 l of water and hydrated for 30 min. followed by the addition of 1.0 ml of TMAC. Next, a buffer comprising a mixture of potassium carbonate and potassium hydroxide was added drop-wise to the polymer solution to a pH of 10.75. Then the fluid was crosslinked with 1.5 ml of XLW-30 crosslinker (a product of Baker Hughes Incorporated), a borate ore slurried in hydrocarbon oil. Crosslinking did not occur until later with the addition of heat. Then 42 g of fluid was placed into the Fann 50 C cup, the cup placed on the viscometer and the sample pressured to 200 psi with nitrogen. A rate sweep using 105, 85, 65 and 45 sec$^{-1}$ was conducted and repeated every 15 min. As in Example C, the accompanying stresses and rates were used to calculate the Power Law indicies, n= and K=. These were used to calculate the viscosity at 100 sec$^{-1}$. The interim rate was 105 sec$^{-1}$ and the rate sweeps conducted every 15 min. The initial viscosity was 25 cP at 100 sec$^{-1}$ and 77° F. This low viscosity early on is desirable in a fracturing treatment to minimize friction pressure. The sample was then heated to 175° F. and the viscosity measured after 34 min at temperature was 275 cP at 105 sec$^{-1}$. The viscosity slowly increased for the first 82 min. to 318 cP and stabilized. After 5 hr of shear and heating the final viscosity was 292 cP at 100 sec$^{-1}$. This again demonstrates a fluid that can be made using reduced amounts of preferred polymer in wells requiring 5 hr of pumping and having bottom hole static temperatures of 175° F.

EXAMPLE E

The test in Example D was repeated using 2.4 g of preferred polymer in 1 l of water and hydrated for 30 min. Afterwards, 1.0 ml of TMAC and 2.0 ml of 50% (wt) aqueous sodium thiosulfate pentahydrate were added. Then the pH was increased after 30 min of hydration to 11.5 with the potassium carbonate/hydroxide buffer. Lastly, 1.25 ml of XLW-30 crosslinker was added and 42 g of this fluid was placed on the Fann 50 C. The initial viscosity at 100 sec$^{-1}$ and 77° F. was 23 cP. The sample was then heated to 225° F. and the initial viscosity at temperature was 233 cP. The viscosity continued to increase for 50 min to 275 cP and remained stable for about 3 hr at 227 cP. This again shows that wells can be adequately treated for at least 3 hr at 225° F.

EXAMPLE F

The test in Example E was repeated using 1 ml of TMAC, 3.0 g of preferred polymer, 1.0 ml of surfactant and 5.0 ml of 50% (wt) aqueous sodium thiosulfate pentahydrate in 1 l of water. The pH was adjusted to 12.0 with the potassium carbonate/hydroxide buffer and crosslinked with 2.0 ml of XLW-30 crosslinker. Then, 42 g of sample was placed on the Fann 50 C. The initial viscosity was 45 cP at 73° F. and 100 sec$^{-1}$. The sample was heated to 250° F. and the initial viscosity at temperature was 202 cP. The viscosity continued to increase to 299 cP over 114 min then stabilized. After 258 min., the viscosity was still 289 cP. This shows that at 0.3% (wt of fluid) polymer should be adequate to fracture most wells having a bottom hole static temperature of 250° F. or less.

EXAMPLE G

The other essential parameter necessary for fracturing is fluid loss control. Shown below are a series of gels used in Examples C-F shown and their fluid loss control at various temperatures at a 1,000 psi pressure differential using a 1@ diameter and 1@ length 100 mD Berea core to measure fluid loss control.

| Polymer (% wt/vol) | Temperature (° F.) | CIII (ft/min$^{1/2}$) | Spurt (gal/ft$^2$) |
|---|---|---|---|
| 0.192 | 125 | 0.0109 | 0.4968 |
| 0.216 | 175 | 0.0075 | 0.4220 |
| 0.240 | 200 | 0.0102 | 0.0897 |
| 0.240 | 225 | 0.0099 | 0.2221 |
| 0.300 | 250 | 0.0095 | 0.2291 |

The fluid loss control demonstrates that the fluid has adequate control even in higher permeability rock to perform as a viable fracturing fluid, even though the polymer concentration is significantly reduced.

EXAMPLE H

One important advantage achieved through the use of the present invention is to use less polymer in an effort to reduce sand pack damage. In this example, a test measuring the degree of sand pack damage is conducted. A fluid was prepared by mixing 0.264 g of preferred polymer in 1 l of water containing 1.0 ml of TMAC and 1.0 ml of surfactant designed to help clean-up. After hydrating for 30 min., 2 ml of 45% (wt) aqueous potassium carbonate was added followed by 1.0 ml of triethylacetyl citrate and 0.024% (by wt of fluid) sodium persulfate as a gel degrading substance. The fluid was crosslinked with 1.0 ml of XLW-30A borate crosslinker, a product of Baker Hughes Incorporated.

The cell was prepared using the standard API sand pack conductivity cell using Ohio Sandstone core plates and 63 g of proppant for a concentration of 2 lb/ft$^2$ of 20/40 Ottawa White sand. The closure pressure on the sand pack was adjusted to 3,500 psi. After bringing the cell to 200° F. and using 500 psi back pressure, 25 pore volumes of the fluid, prepared above, was injected into the cell initially at 500 psi and ramped up to 1,500 psi during injection as a method to promote filter cake deposition. A total of 143 ml of fluid were collected. After fluid injection, the cell was shut-in overnight to allow the fluid to degrade.

After shut-in, DI water is flowed through the cell, initially at 13.69 ml/min dropping to 6.02 ml/min. The differential pressure and pack width are measured and together with fluid viscosity at 0.302 cP for water are used to calculate conductivity in the units of Darcies. The baseline was determined from Stimlab=s Predict K software to be 160 Darcies and this was used to calculate the degree of damage. Fluid flow for 50 hr at temperature resulted in 66% clean-up comparing permeability to the baseline. Then dry gas was flowed through the cell for several minutes followed again by DI water at 6.62 ml/min for an ultimate 83.4% regain permeability. This example illustrates the advantage achieved by the use of the lower polymer loading in allowing adequate clean-up and in generating less formation and sand pack damage.

An invention has been provided with several advantages. The fracturing fluids of the invention can be formulated to use less guar gum than is customarily used in the industry. This presents the potential for reducing formation damage in the subterranean interval being treated. While the concentration of polymer is reduced below conventional loadings, the necessary properties for performing the fracturing treatment are maintained. In particular, both the fluid viscosity and fluid loss properties are maintained within desirable limits.

While the invention has been shown in one of its forms, it is not thus limited and is susceptible to various changes and modifications without departing from the spirit thereof.

We claim:

1. A method of fracturing a subterranean formation, comprising pumping into the formation a fracturing fluid comprising an aqueous base fluid, a non-derivatized guar having an intrinsic viscosity greater than or equal to 16 dL/g and a crosslinking agent, wherein the fracturing fluid is pumped into the formation at a pressure sufficient to fracture the formation.

2. The method of claim 1, wherein the high molecular weight non-derivatized guar has an intrinsic viscosity of about 16.3 dL/g.

3. The method of claim 1, wherein the pH of the fracturing fluid is in the range from about 9.5 to 11.5.

4. The method of claim 1, wherein the fracturing fluid further comprises a proppant.

5. The method of claim 1, wherein the non-derivatized guar having an intrinsic viscosity greater than or equal to 16 dL/g is prepared by splitting non-derivatized guar endosperm and subjecting the guar split to partial hydration, shearing, drying and pulverization.

6. The method of claim 5, wherein during shearing the polymer chains of the guar are relaxed by varying the rate of shear.

7. The method of claim 1, wherein the crosslinking agent is a source of borate ions.

8. The method of claim 7, wherein the source of borate ions is selected from the group consisting of alkali metal borates, alkaline earth metal borates, boric acid, borate ores, borates complexed to organic compounds, and mixtures thereof.

9. A method of fracturing a subterranean formation, comprising the steps of:
    formulating a fracturing fluid by blending together an aqueous fluid, a non-derivatized guar having an intrinsic viscosity greater than about 16 dL/g and a crosslinking agent; and
    pumping the formulated fluid into the subterranean formation at a pressure sufficient to fracture the formation.

10. The method of claim 9, wherein the non-derivatized guar has an intrinsic viscosity of 16.3 dL/g.

11. The method of claim 9, wherein the crosslinking agent is a source of borate ions.

12. The method of claim 11, wherein the source of borate ions is selected from the group consisting of alkali metal borates, alkaline earth metal borates, boric acid, borate ores, borates complexed to organic compounds, and mixtures thereof.

13. The method of claim 9, wherein the pH of the formulated fluid is from about 9.5 to 11.5.

14. In a method of fracturing a subterranean formation wherein an aqueous fracturing fluid comprising a viscosifying polymer is pumped into the formation at sufficient pressure to fracture the formation wherein the viscosifying polymer is a non-derivatized guar, the improvement being the high molecular weight non-derivatized guar in the fracturing fluid having an intrinsic viscosity greater than or equal to 16 dL/g.

15. The method of claim 14, wherein the non-derivatized guar has an intrinsic viscosity of 16.3 dL/g.

16. The method of claim 14, wherein the pH of the aqueous fracturing fluid is in the range from about 9.5 to 11.5.

17. The method of claim 14, wherein the non-derivatized guar having an intrinsic viscosity greater than or equal to 16 dL/g is prepared by splitting non-derivatized guar endosperm and subjecting the guar split to partial hydration, shear, drying and pulverization to produce a fine powder.

18. A method of fracturing a subterranean formation, comprising pumping into the formation an aqueous fracturing fluid at a pressure sufficient to fracture the formation, wherein the aqueous fracturing fluid comprises a non-derivatized guar having an intrinsic viscosity greater than or equal to 16 dL/g and wherein the non-derivatized guar is prepared by splitting non-derivatized guar endosperm and subjecting the guar split to shearing at a rate sufficient to relax chains of the guar split but not rupture the guar split.

19. The method of claim 18, wherein the non-derivatized guar has an intrinsic viscosity of 16.3 dL/g.

20. The method of claim 18, wherein the pH of the aqueous fracturing fluid is in the range from about 9.5 to 11.5.

* * * * *